US012225089B2

(12) United States Patent
Lewin et al.

(10) Patent No.: US 12,225,089 B2
(45) Date of Patent: Feb. 11, 2025

(54) NETWORK-AWARE ENDPOINT DATA LOSS PREVENTION FOR WEB TRANSACTIONS

(71) Applicant: Microsoft Technology Licensing, LLC, Redmond, WA (US)

(72) Inventors: Guy Lewin, Brooklyn, NY (US); Yossi Haber, Gannei Tikva (IL); Meital Ben David, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 200 days.

(21) Appl. No.: 17/840,726

(22) Filed: Jun. 15, 2022

(65) Prior Publication Data
US 2023/0412693 A1 Dec. 21, 2023

(51) Int. Cl.
*H04L 67/147* (2022.01)
*H04L 9/06* (2006.01)
(Continued)

(52) U.S. Cl.
CPC .......... *H04L 67/147* (2013.01); *H04L 9/0643* (2013.01); *H04L 9/3263* (2013.01); *H04L 67/146* (2013.01)

(58) Field of Classification Search
CPC ... H04L 67/147; H04L 9/0643; H04L 9/3263; H04L 67/146; H04L 63/1408;
(Continued)

(56) References Cited

U.S. PATENT DOCUMENTS

| 8,950,005 B1 * | 2/2015 | Torney | ................. H04L 63/101 713/193 |
| 9,003,475 B1 | 4/2015 | Jaiswal et al. | |

(Continued)

FOREIGN PATENT DOCUMENTS

| EP | 2933973 A1 | 10/2015 |
| WO | 2017058842 A1 | 4/2017 |

OTHER PUBLICATIONS

"Application as Filed in U.S. Appl. No. 17/122,649", Filed Date: Dec. 15, 2020, 44 Pages.
(Continued)

*Primary Examiner* — Mohammad W Reza
(74) *Attorney, Agent, or Firm* — Weaver IP L.L.C.

(57) ABSTRACT

Methods for network aware endpoint data loss prevention (DLP) in web transactions are performed by systems and devices, which includes implementing DLP on endpoint devices and focuses on web traffic events from web browsers, while also associating the events to the network source entity. File download and upload events are intercepted from the operating system by a file system filter that determines the process creating events is a web browser based on process identifiers and comparing process names and process executable signatures. A uniform resource locator (URL) from a current tab or session is retrieved for the web browser. Policies for events are evaluated via a policy server or via cache, and additional data from the file is provided for policy decisions when necessary. DLP actions taken via the file system filter to block or allow events, including encrypting file data, are based on the policy decisions.

20 Claims, 6 Drawing Sheets

(51) Int. Cl.
*H04L 9/32* (2006.01)
*H04L 67/146* (2022.01)

(58) Field of Classification Search
CPC ... H04L 63/0227; H04L 63/20; G06F 21/554; G06F 21/6281
See application file for complete search history.

(56) References Cited

U.S. PATENT DOCUMENTS

| | | | |
|---|---|---|---|
| 10,248,797 B1* | 4/2019 | Shinde | H04L 67/568 |
| 11,178,112 B2 | 11/2021 | Lewin et al. | |
| 11,307,911 B2 | 4/2022 | Lewin et al. | |
| 2015/0100357 A1* | 4/2015 | Seese | H04L 63/20 705/7.12 |
| 2020/0412697 A1 | 12/2020 | Lewin et al. | |
| 2023/0095576 A1* | 3/2023 | Ureche | G06F 21/84 726/26 |

OTHER PUBLICATIONS

"Application as Filed in U.S. Appl. No. 17/364,168", Filed Date: Jun. 30, 2021, 42 Pages.
"Chromagnon", Retrieved from: https://github.com/JRBANCEL/Chromagnon/tree/SNSS, Jan. 5, 2021, 1 Page.
"CIGLOO", Retrieved from: https://web.archive.org/web/20220211145859/https://cigloo.io/, Feb. 11, 2022, 5 Pages.
"Cloudflare Gateway", Retrieved from: https://web.archive.org/web/20220605032522/https://www.cloudflare.com/products/zero-trust/gateway/, Jun. 5, 2022, 11 Pages.
"epilande / alfred-browser-tabs", Retrieved from: https://github.com/epilande/alfred-browser-tabs/blob/main/src/list-tabs.js, Oct. 31, 2021, 2 Pages.
"Zscaler™ Cloud Browser Isolation", Retrieved from: https://web.archive.org/web/20220423083618/https://www.zscaler.com/resources/data-sheets/zscaler-cloud-browser-isolation.pdf, Apr. 23, 2022, 3 Pages.
Curwin, et al., "Protect apps with Microsoft Defender for Cloud Apps Conditional Access App Control", Retrieved from: https://docs.microsoft.com/en-us/defender-cloud-apps/proxy-intro-aad, May 24, 2022, 11 Pages.
Jupudi, et al., "WindowsDefenderApplicationGuard CSP", Retrieved from: https://docs.microsoft.com/en-us/windows/client-management/mdm/windowsdefenderapplicationguard-csp#savefilestohost, Jun. 1, 2022, 12 Pages.
Wang, Betty, "File transfer", Retrieved from: https://docs.citrix.com/en-us/linux-virtual-delivery-agent/current-release/configure/file/file-transfer.html, May 25, 2022, 4 Pages.
"International Search Report and Written Opinion Issued in PCT Application No. PCT/US23/022305", Mailed Date: Jul. 24, 2023, 11 Pages.

* cited by examiner

NETWORK-AWARE ENDPOINT DATA LOSS PREVENTION FOR WEB TRANSACTIONS

BACKGROUND

Current data loss prevention (DLP) solutions are either network based, e.g., via a proxy, or endpoint based, e.g., with a presence on the client machine. Network based solutions lack visibility to all events without a client presence. Some solutions utilize injections JavaScript™ (from Oracle Corporation) code to run on the client device in order to emulate or perform client-side controls. This JavaScript™ code impacts the performance and users' experience when browsing websites, and it requires heavy computation resources for DLP providers and hosts. On the other hand, endpoint DLP solutions are not able to associate the DLP activities such as downloads and uploads with network resources and applications because of the complexity involved.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for network aware endpoint data loss prevention (DLP) in web transactions are performed by systems and devices, which includes implementing DLP on endpoint devices and focuses on web traffic events from web browsers, while also associating the events to the network source entity. File download and upload events are intercepted from the operating system by a file system filter that determines the process creating events is a web browser based on process identifiers and comparing process names and process executable signatures. A uniform resource locator (URL) from a current tab or session is retrieved from the web browser by querying an open tabs database. Policies for events are evaluated via a policy server or via cache, and additional data from the file is provided for policy decisions when necessary. DLP actions taken via the file system filter to block or allow events, including encrypting file data, are based on the policy decisions.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
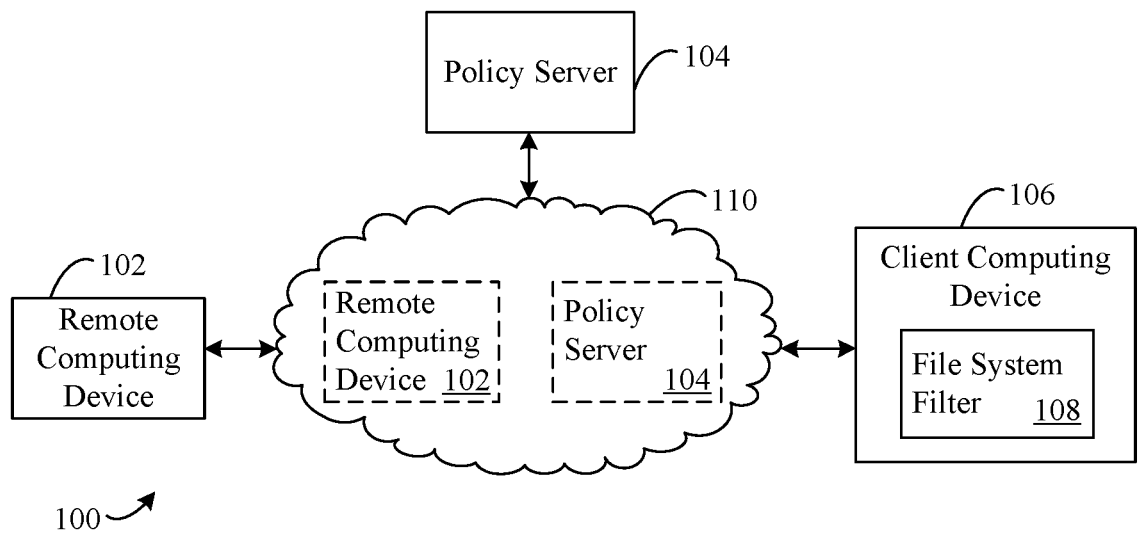
FIG. 1 shows a block diagram of a system for network aware endpoint data loss prevention (DLP) in web transactions, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for network aware endpoint DLP in web transactions. Section III below describes example mobile and computing device embodiments that may be used to implement features of the embodiments described herein. Section IV below describes additional examples and advantages, and Section V provides some concluding remarks.

II. Example Aspects for Network Aware Endpoint DLP in Web Transactions

Data loss prevention (DLP) techniques provide different network- and endpoint-based implementations for securing and protecting data in network and Internet communications. DLP solutions seek to minimize data exfiltration and malicious content infiltration for computing systems and networks. Embodiments herein provide for network aware endpoint DLP in web transactions that enable the benefits of both network- and endpoint-based DLP, but without the drawbacks of either.

One example of these embodiments is an implementation of a file system filter at the operating system (OS) level. It should be noted, however, that the example implementations are not limiting, but rather, are illustrative in nature. The file system filter may reside in the kernel of the OS, or both in the kernel and in the user-space which may allow for additional flexibility for operational calls in performance of network aware endpoint DLP in web transactions.

The embodiments herein provide for implementing DLP on endpoint, or client, devices and focuses on web traffic events from web browsers, such as file reads and file writes at the endpoint device. While web traffic events are a focus, as they involve the endpoint, the described DLP solutions also enable associating these events at the endpoint to the network source entity, of which prior endpoint solutions had no knowledge. File download events, corresponding to endpoint device writes, and file upload events, corresponding to endpoint device reads, are intercepted from the OS and file system by a file system filter. As noted above, the file system filter resides in at the OS level, at least partially in the system kernel.

The file system filter determines if the process creating or causing the events is a web browser application. The file system filter makes these determinations based at least on process identifiers associated with the intercepted events and comparisons of process names and process executable signatures. The file system filter identifies and retrieves a uniform resource locator (URL) from a current tab or session for web browser applications determined to create or cause the events. URLs may be retrieved by querying an open tabs database of a web browser application or the web browser application itself, by reading a current session file of the web browser application, by reading the URL from an OS-level metadata file that includes origin information of download files, and/or the like. Policies for events are evaluated via policy server or via cache for repeated transactions, and additional data from the file is provided for policy decisions when necessary. File data for download events is buffered, without persistently storing it, for provision to the policy server. DLP actions taken via the file system filter to block or allow events, including encrypting file data based on policy decisions.

Prior DLP solutions have several shortcomings. Network-only based DLP solutions do not see all DLP events. That is, because not all downloads and/or uploads are transferred "as-is" or "on the wire," network-based solutions lack the ability to identify various DLP events during network transmissions. Additionally, some prior, network-based DLP solutions utilize JavaScript™ to perform client-side DLP controls, yet this impacts the performance for loading and interacting with web pages at the client endpoint, and also requires heavy resource commitments to modify all JavaScript™ code sent from all protected applications. A client-side DLP presence alleviates these issues, but has its own drawbacks. While endpoint DLP solutions are able to inspect DLP controls on the client side, such implementations are not able to associate DLP events with web activity, and this prevents endpoint DLP solutions from taking remote device identities into consideration.

Thus, to avoid the issues noted above, the described network aware endpoint DLP in web transactions via a file system filter enable both client-side DLP event awareness together with operations and techniques that identify associated network-side information needed for DLP policy determinations and actions, without the need to generate and inject additional code in network transmissions. Accordingly, the embodiments herein provide solutions that improve systems via network aware endpoint DLP in web transactions. These and other embodiments will be described in further detail below in association with the Figures, and in the Sections/Subsections that follow.

Systems, devices, and apparatuses may be configured in various ways for network aware endpoint DLP in web transactions. For instance, FIG. 1 is a block diagram of a system 100, according to embodiments. System 100 is configured for network aware endpoint DLP in web transactions, according to embodiments. As shown in FIG. 1, system 100 includes a remote computing device 102 (also "remote device" 102 herein), a policy server 104, and a client computing device 108 (also "client device" 108 herein) that communicate in embodiments with each other over a network 110. It should be noted that in various embodiments different numbers of remote devices, client devices, networks, and/or policy servers are present, and additionally, according to embodiments, any combination of the systems and/or components illustrated in FIG. 1 are present in system 100. For example, embodiments of system 100 having cloud- and/or network-based systems and devices are included herein, where embodiments enable network aware endpoint DLP in web and/or other network transactions.

Network 110 comprises different numbers and/or types of communication links that connect computing devices and hosts/servers such as, but not limited to, the Internet, wired or wireless networks and portions thereof, point-to-point connections, local area networks, enterprise networks, cloud networks, and/or the like, in embodiments. For example, as exemplarily illustrated, network 110 may comprise the Internet, a cloud-based platform or architecture, an enterprise network, etc., and may include remote device 102 and/or policy server 104, at one or more geographic locations. In another example, network 110 may be a cloud-based platform network and/or enterprise network to which remote device 102 and/or client device 106 connect via the Internet or another network. Additionally, remote device 102, policy server 104, and/or client device 106 may be implemented in any number or combination of network types.

Remote device 102, in embodiments, comprises one or more server computers or computing devices, which may include one or more distributed or "cloud-based" servers. In embodiments, remote device 102 is associated with, or is a part of, a cloud-based service platform, and in some embodiments, remote device 102 comprises an on-premises server(s) in addition to, or in lieu of, cloud-based servers. Remote device 102 in various embodiments includes any number, type, or combination of other computing devices and/or computing systems, including a terminal, a personal computer, a laptop computer, a tablet device, a smart phone, a personal digital assistant, a server(s), a gaming console, and/or the like, that may include internal/external storage devices, that are utilized to host services and/or applications, and/or to otherwise make available any type of information, data, files, programs, and/or the like, to client devices such as client device 106. Additionally, remote device 102 in various embodiments is any number, type, or combination of computing devices and/or computing systems to which any type of information, data, files, programs, and/or the like may be transmitted from client device 106.

Figure 2:
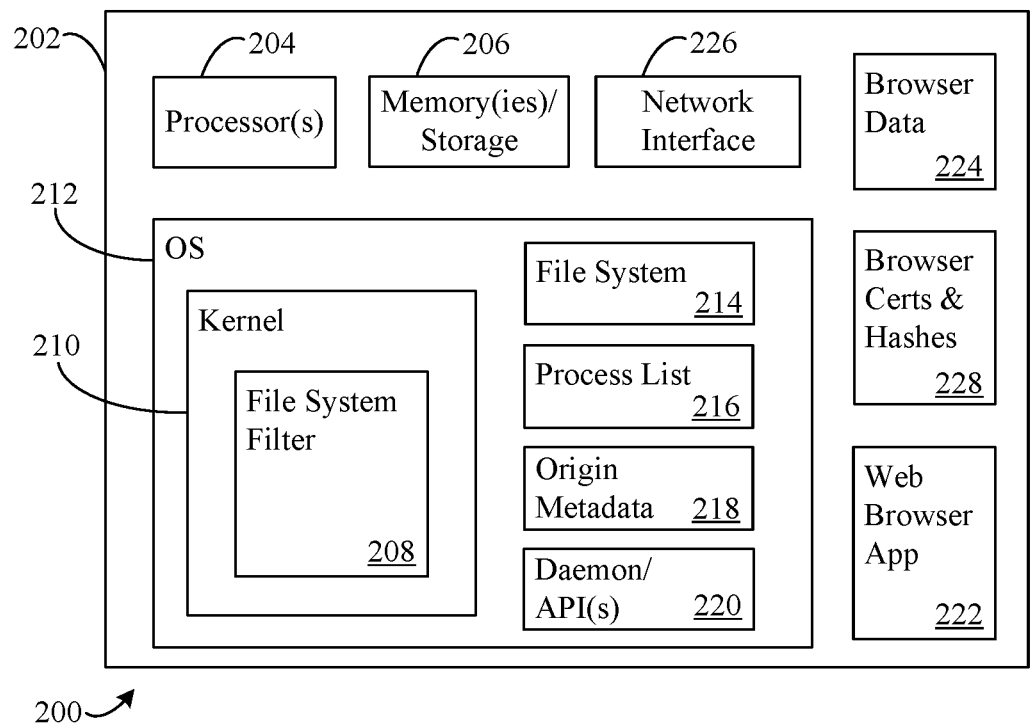
FIG. 2 shows a block diagram of a computing system configured for network aware endpoint DLP in web transactions, according to an example embodiment.
Figure 9:
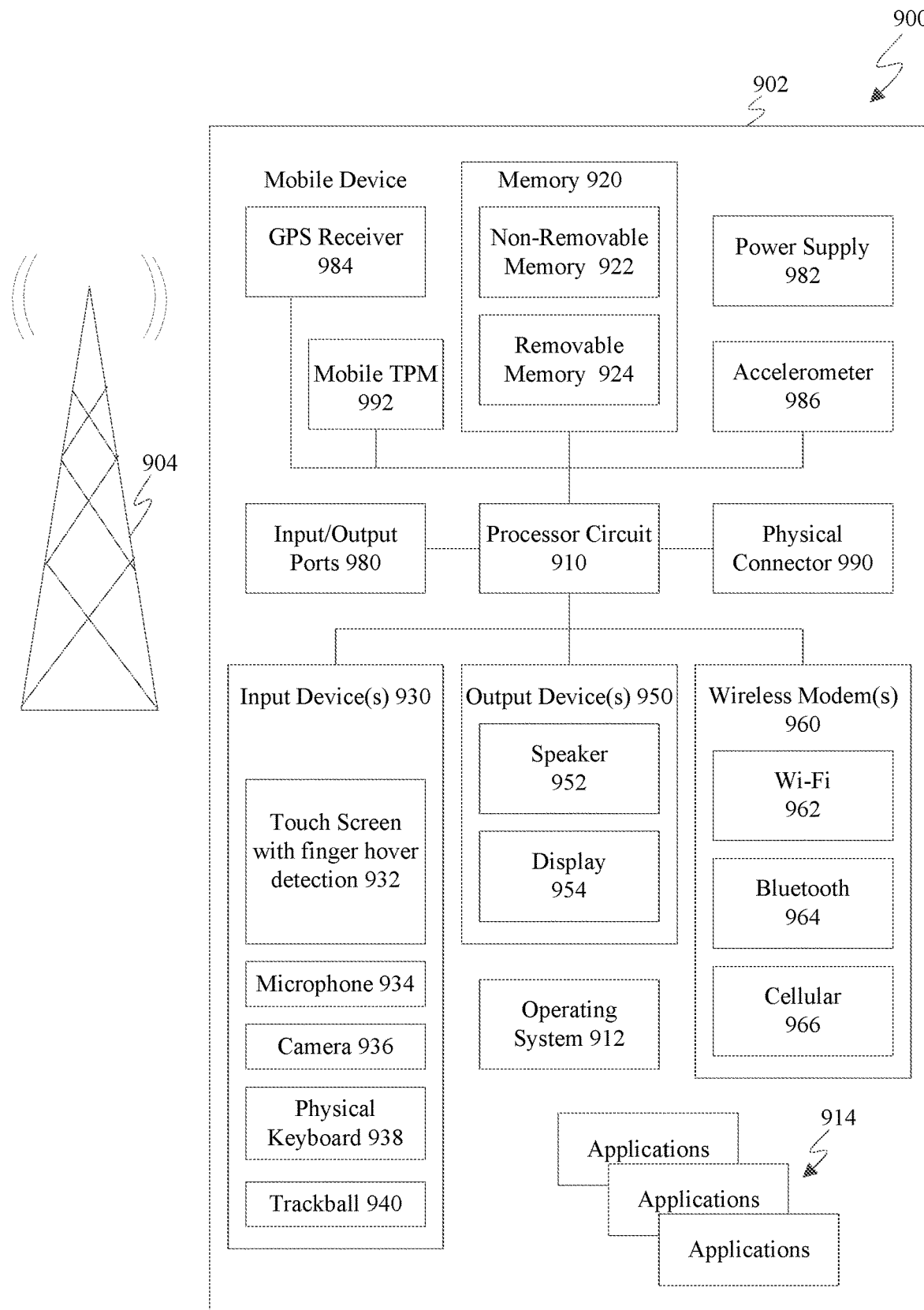
FIG. 9 shows a block diagram of an example mobile device that may be used to implement embodiments.

Remote device 102 is configured to host and execute any type of service and/or application accessed/utilized by a user of client device 102 that may include the transfer of data, information, files, etc., e.g., a DB server application, an email application/service, a document sharing service, productivity applications, etc. (not shown for brevity and illustrative clarity), and in some aspects, remote device 102 may store and/or transmit malicious software/code such as viruses, malware, etc. In embodiments, client device 106 communicates with remote device 102 via a web browser application executing at client device 106, e.g., electronic communications that include data packets, requests, and/or the like. Remote device 102 may be a computing device or system of a cloud-based platform that hosts services, applications, etc., for tenants. Remote device 102 also includes additional components (not shown for brevity and illustrative clarity) including, but not limited to, components and subcomponents of other devices and/or systems herein, e.g., as shown in FIG. 2, FIG. 9, and/or FIG. 10 described below, in accordance with embodiments.

Policy server 104 comprises one or more server computers or computing devices, which may include one or more distributed or "cloud-based" servers. In embodiments, policy server 104 is associated with, or is a part of, a cloud-based service platform, and in some embodiments, policy server 104 comprises an on-premises server(s) in addition to, or in lieu of, cloud-based servers. Policy server 104 is configured to store policies and host a policy engine that evaluates events, as described herein, for compliance with the policies. As illustrative examples, policies may be implemented via policy server 104 that prohibit events such as the upload or download of certain types of files, data, information, etc., that allow or block such events, that require encryption for such events, and/or the like, based at least on one or more factors, including but without limitation: an identity or type of service/application of a remote device associated with the event, the content of the files or content portions thereof, data, information, etc., an identity of the user of a client device, and/or the like. Policy server 104 is configured to receive the above factors from client device 106 and to return indicia of policy decisions and/or determinations. In embodiments, policy server 104 is configured to request additional portions of the files, data, information, etc., to make the policy decisions and/or determinations.

Client device 106, in embodiments, comprises one or more computers or computing devices. Client device 106 in various embodiments includes any number, type, or combination of other computing devices and/or computing systems, including a terminal, a personal computer, a laptop computer, a tablet device, a smart phone, a personal digital assistant, a server(s), a gaming console, and/or the like, that may include internal/external storage devices, that are utilized to access services and/or applications, and/or to otherwise upload and/or download any type of information, data, files, programs, and/or the like, to/from remote devices such as remote device 102. In embodiments, client device 106 is associated with a cloud-based service platform in which client device 106 is a member of a tenancy. Additionally, as noted above, client device 106 is configured to communicate with remote device 102 via a web browser application executing at client device 106 for electronic communications. Client device 106 may be configured to execute any type of operating system (OS) and any type of web browser application.

As shown in FIG. 1, client device 106 includes a file system filter 108. In embodiments, file system filter 108 is an OS-level driver or filter that may reside in the kernel and/or the user space of the OS implemented by client device 106. File system filter 108 is configured to intercept upload and download events initiated via a web browser application of client device 106. For instance, upload events correspond to file reads to the file system of the client device 106 OS, and download events correspond to file writes to the file system. These events are intercepted by file system filter 108 at the OS-level in order to determine if a web browser application initiates these events, and if so, to facilitate determinations for handling the events according to policy requirements for network aware endpoint DLP at client device 106. Further details regarding file system filter 108 are provided below.

Client device 106 also includes additional components (not shown for brevity and illustrative clarity) including, but not limited to, components and subcomponents of other devices and/or systems herein, e.g., as shown in FIGS. 2, 9, and/or 10 described below, in embodiments.

As noted and described herein, computing devices and systems are applicable to any type of system for network aware endpoint DLP in web transactions, according to embodiments. One example of implementations noted above are network, or "cloud," implementations, applications, or services in a network architecture/platform. A cloud platform includes a networked set of computing resources, including servers, routers, etc., that are configurable, shareable, provide data security, and are accessible over a network such as the Internet, according to embodiments. Cloud applications/services such as those hosted by remote computing device 102, etc., in various embodiments are configured to run on these computing resources, often atop operating systems that run on the resources, for entities that access the applications/services, locally and/or over the network. A cloud platform is configured to support multi-tenancy, where cloud platform-based software services multiple tenants, with each tenant including one or more users who share common access to software services of the cloud platform. Furthermore, a cloud platform is configured to support hypervisors implemented as hardware, software, and/or firmware that run virtual machines (emulated computer systems, including operating systems) for tenants. A hypervisor presents a virtual operating platform for tenants. In some embodiments herein, tenants of cloud-based implementation services may communicate with cloud-based servers and hosts utilizing network aware endpoint DLP in web transactions, as described herein.

Client devices, such as client device 106, are configured in various ways for network aware endpoint DLP in web transactions via file system filter 108. For instance, referring now to FIG. 2, a block diagram of a system 200 is shown for network aware endpoint DLP in web transactions, according to an example embodiment. System 200 is configured to be an embodiment of system 100 of FIG. 1, e.g., client device 106. System 200 is described as follows and may reference the described devices, systems, components, etc., of system 100 in FIG. 1.

System 200 includes a computing system 202, which is an embodiment of a system, server, or computing device at which a described file system filter is implemented, and which is any type of computing device or computing system, as mentioned elsewhere herein or as otherwise known. As shown in FIG. 2, computing system 202 includes one or more processors ("processor") 204, one or more of a memory and/or other physical storage device ("memory") 206, as well as one or more network interfaces ("network interface") 226. Computing system 202 includes an OS 212 and a web browser application 222. In embodiments, while not shown for brevity and illustrative clarity, computing system 202 includes additional software, applications, and/or additional ones of components illustrated in FIG. 2, as would be understood by one of skill in the relevant art(s) having the benefit of this disclosure.

System 200 also includes additional components (not shown for brevity and illustrative clarity) including, but not limited to, components and subcomponents of other devices and/or systems herein, as well as those described below with respect to FIG. 9 and/or FIG. 10, according to embodiments.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 may be multi-core processors configured to execute more than one processing thread concurrently, and cores of processor 204 may be grouped with portions of memory 206. Processor 204 may comprise circuitry that is configured to execute computer program instructions such as, but not limited to, embodiments of OS 212 and/or web browser application 222, including one or more of the components thereof as described herein, which may be implemented as computer program instructions to perform network aware endpoint DLP in web transactions, as described herein.

Memory 206 may include volatile storage portions such as a random access memory (RAM), cache(s), etc., and/or persistent storage portions such as hard drives, nonvolatile RAM, and/or the like, to store or be configured to store computer program instructions/code as described herein, as well as to store other information and data described in this disclosure including, without limitation, OS 212, a kernel 210, a file system filter 208, files associated with a file system 214, a process list 216, origin metadata 218, daemon/API(s) 220, web browser application 222, browser data 224, and/or browser certificates and hash values 228, including one or more of the components thereof as described herein, etc.

Network interface 226 may be any type or number of wired and/or wireless network adapter, modem, etc., configured to enable system 200, including computing system 202, to communicate with other devices and/or systems over a network, including cloud networks, such as communications between computing system 202 and other devices, systems, hosts, etc., of system 100 in FIG. 1 over a network such as network 110 and/or the like.

Web browser application 222 may be any type of web browser application/program and is configured to enable a user of computing system 202 to interact with a remote device, e.g., remote device 102 in FIG. 1, via the Internet or other network, as described herein and as would be understood by a person of skill in the relevant art(s). For example, web browser application 222 may be a Microsoft Edge® browser from Microsoft Corporation of Redmond, WA, a Firefox® browser from Mozilla Corporation of San Francisco, CA, a Safari® browser from Apple, Inc. of Cupertino, CA, a Chrome® browser from Google Inc. of Mountain View, CA, or any other web browser application. Web browser application 222 executes in a system memory of memory 206, and may store in memory 206 browser data 224. Browser data 224 includes session/tab information for a browser application of a given type that includes information and data describing current/active sessions, tabs, instances, etc., of web browser application 222. Browser data 224 may be updated in real-time, or approximately in real-time, to accurately track activities of web browser application 222. While a single web browser application is shown for web browser application 222, this is for purposes of illustrative clarity, and two or more of web browser application 222 being present is contemplated for embodiments herein.

Also associated with web browser application 222 is browser certificates and hash values 228, which may be persisted in memory 206. Browser certificates and hash values 228 includes a list or other type of data structure of publisher certificates and hash values that correspond to the identity of web browser application 222 and instances, sessions, and/or tabs thereof, and enable file system filter 208 to verify and/or identify the instances, sessions, and/or tabs as processes that initiate or cause events to be intercepted and handled for network aware endpoint DLP in web transactions, as described herein.

OS 212 may be any type of operating system and is configured to be executed by computing system 202. OS 212 may be any version of Microsoft® Windows® from Microsoft Corporation of Redmond, WA, macOS® from Apple, Inc. of Cupertino, CA, mobile device versions thereof, or any other operating system, including LINUX® and other UNIX® variants, by way of example. In the context of versions for Microsoft® Windows®, file system filter 208 may comprise a "minifilter" driver in the kernel of the OS that communicates with file system 214 for calling filtering functions of the driver. While embodiments herein may be described and/or illustrated with respect to a particular OS, it should be understood that similar and/or equivalent implementations of aspects herein for different OSs are contemplated under the same described techniques for network aware endpoint DLP in web transactions. That is, exemplary descriptions herein are non-limiting and serve to illustrate aspects of network aware endpoint DLP in web transactions across different platforms and implementations without limitation.

OS 212 includes file system 214, which is a file system configured to manage the formatting and persistent storage of data, information, and files in memory 206 of computing system 202, and process list 216, which is a list stored in memory 206 that includes the processes currently running on processor 204, as well as information associated with such processes (e.g., process identifiers, execution paths, etc.). OS 212 may also maintain metadata for file origins in origin metadata 218, including source origins of download files, e.g., an associated URL, and origin metadata 218 may be stored, e.g., persistently, in memory 206 by OS 212. In the context of specific OS platforms, origin metadata 218 may be stored in extended properties of the Apple® file system in macOS® versions, and in Windows® OS versions, e.g., employing the New Technology File System (NTFS), origin metadata 218 may be stored in the default file system, e.g., file system 214 in FIG. 2. Portions of origin metadata 218, such as the URL, may be stored at the OS-level as extended file properties and/or low-level hidden properties of the download files.

OS 212 further includes kernel 210 that operates in a kernel space of OS 212, as would be understood by a person of skill in the relevant art(s). Kernel 210 includes file system filter 208. File system filter 208 is a network-aware, OS-level driver or filter, which may be an embodiment of file system filter 108 of FIG. 1. While shown for illustrative clarity and brevity as being within kernel 210, file system filter 208 may also have components thereof that reside outside of the kernel space in the user space of OS 212, or a combination of kernel space and user space components. For instance, OS 212 may include daemon/API(s) 220 comprising a user-space daemon configured to perform functions and operations of file system filter 208, including API calls for information and/or operations, as well as for event control when events are intercepted by file system filter 208, as described herein. Equivalently, in some embodiments, e.g., in the context of macOS®, AppleScript® may be used to make calls for information to web browser application 222, which is exposed to AppleScript® in macOS®.

When requests for reads of and writes to files are sent to file system 214 via OS 212, file system filter 208 is configured to intercept these requests, as events, and hold them, if necessary, for policy determinations to be made thereon. In embodiments, an intercepting component of file system filter 208 may reside in kernel 210, while other components reside in the user-space of OS 212, e.g., in daemon/API(s) 220. An event may be held when file system filter 208 identifies the initiator, or cause, of the event to be a web browser such as web browser application 222. If the initiator of the event is determined to be web browser application 222, file system filter 208 is configured to retrieve a uniform resource locator (URL) corresponding to the event and to web browser application 222, and to perform one or more DLP actions against the event. The DLP actions taken may be based on a policy determination, e.g., via cached policy indicia or by a policy server such as policy server 104 in FIG. 1, and file system filter 208 is configured to provide the URL and file data to the policy server for policy determinations to be made thereby, and to receive such determinations when made.

Further details regarding file system filter 208 are provided below. For example, FIGS. 3 and 4 will now be described.

Figure 3:
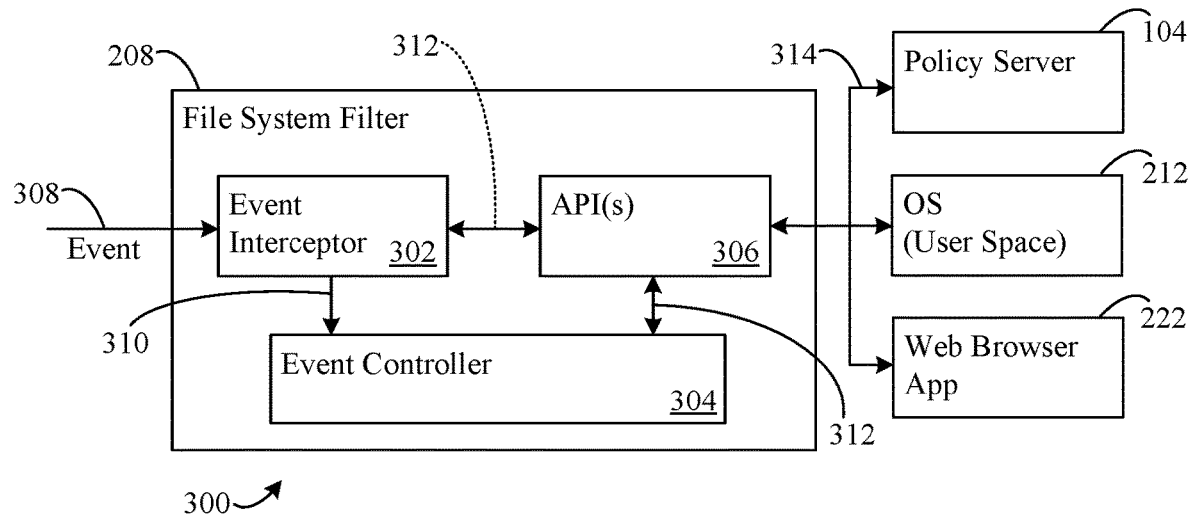
FIG. 3 shows a flow diagram for network aware endpoint DLP in web transactions, in accordance with an example embodiment.
Figure 4:
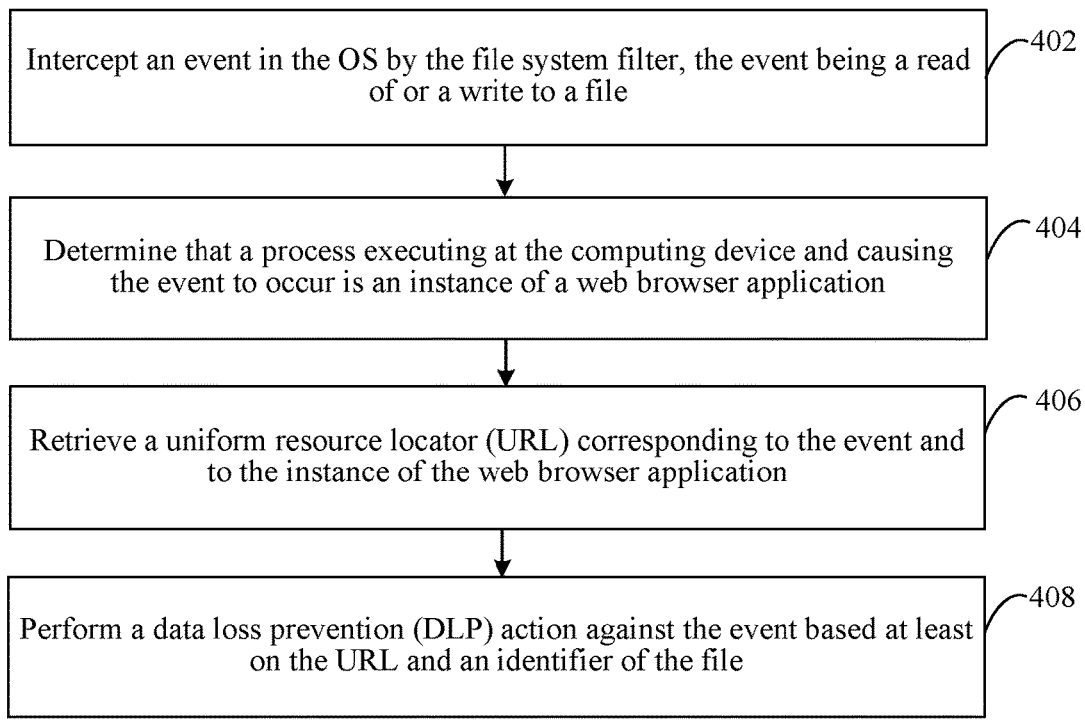
FIG. 4 shows a flowchart for network aware endpoint DLP in web transactions, in accordance with an example embodiment.

FIG. 3 shows a flow diagram 300 for network aware endpoint DLP in web transactions, according to an example embodiment. Flow diagram 300 is provided in the context of file system filter 208 of FIG. 2. FIG. 4 shows a flowchart 400 for network aware endpoint DLP in web transactions, according to example embodiments. System 100 in FIG. 1 and/or system 200 in FIG. 2, e.g., via file system filter 208, operate according to flow diagram 300 and flowchart 400 (which may be an embodiment of flow diagram 300 of FIG. 3).

Further structural and operational examples will be apparent to persons skilled in the relevant art(s) based on the following descriptions. Flow diagram 300 and flowchart 400 are described below with respect to system 100 in FIG. 1 and system 200 of FIG. 2.

As noted above, flow diagram 300 illustrate file system filter 208. As shown, file system filter 208 includes an event interceptor 302, an event controller 304, and API(s) 306. In embodiments, event controller 304 and/or one or more of API(s) 306 may reside in the user space of OS 212, e.g., in daemon/API(s) 220 as noted above for FIG. 2, and file system filter 208 is configured to communicate directly and/or indirectly (e.g., via API calls of API(s) 306) with policy server 104 of FIG. 1, as well as with components of the user space in OS 212 and web browser application 222 of FIG. 2.

Turning also now to FIG. 4, flowchart 400 begins at step 402. In step 402, an event is intercepted in the OS, the event being a read of or a write to a file. For instance, event interceptor 302 is configured to intercept calls to the file system (e.g., file system 214 of FIG. 2), shown as an event 308, that specify reads of files and writes to files. Event interceptor 302 includes hooks or other mechanisms to monitor calls to the file system in order to detect reads of and writes to files managed by the file system that may be initiated by web browser application 222. The inclusion of file system filter 208 in OS 212, e.g., at kernel 210, enables such monitoring by file system filter 208. When event 308 is detected, event information 310 associated with event 308, such as but not limited to a file name, a process identifier of the process initiating event 308, and/or the like, is determined from event 308 and passed from event interceptor 302 to event controller 304, which is configured to manage or handle events such as event 308 that are intercepted by event interceptor 302 of file system filter 208.

As shown in flow diagram 300, event controller 304 is configured to make invocations 312 to API(s) 306 in performance of network aware endpoint DLP in web transactions. In embodiments, invocations 312 to API(s) 306 may be made by event interceptor 302 in lieu of, in conjunction with, and/or in addition to invocations 312 from event controller 304. Invocations 312 made by event controller 304 may be to ones of API(s) 306 for communicating with policy server 104 of FIG. 1, as well as with components of the user space in OS 212 (e.g., as described above for FIG. 2) and web browser application 222 of FIG. 2. In an example, event interceptor 302 and/or event controller 304 may invoke one of API(s) 306 to make a call to the user space in OS 212 (e.g., file system 214) and/or to web browser application 222 to halt, or hold, the read or write operation associated with event 308 subsequent to the intercepting performed in step 402 described above.

Referring again to FIG. 4, flowchart 400 continues at step 404 in which it is determined that a process executing at the computing device and causing the event to occur is an instance of a web browser application. For example, event controller 304 makes one or more invocations 312 to API(s) 306 for information related to the process that initiated event 308 based at least on event information 310. In response, API(s) 306 issue calls 314 to obtain the information associated with invocations 312 (and provided back via returns of calls 314), requested by event controller 304. As an example, invocations 312 to API(s) 306 may cause API(s) 306 to issue calls 314 to the user space of OS 212 for determining a process identifier for event 308 based at least on the intercepting and event information 310. Based at least on the process identifier determined, the instance of web browser application 222 that caused event 308 can be identified.

Continuing with flowchart 400, in step 406, a uniform resource locator (URL) corresponding to the event and to the instance of the web browser application is retrieved. For instance, based at least on the determined instance of web browser application 222 associated with event 308 from step 404, the URL for the event and the instance, tab, and/or session of web browser application 222 can also be determined. In embodiments, the URL is determined from one or more of different methods/techniques. For instance, browser data 224 in FIG. 2 may be read, web browser application 222 may be queried, and/or origin metadata 218 in FIG. 2 may be read, e.g., via API(s) 306, as described in further detail below.

Finally, with respect to flowchart 400, in step 408, a data loss prevention (DLP) action is performed against the event based at least on the URL and an identifier of the file. For example, event controller 304 is configured to perform a DLP action for event 308. The DLP action taken may be based at least on the URL and file identifier (e.g., a file name, file type, etc.), and may also be based on content of the file. In embodiments, the URL, and file identifier and/or content of the file that is written to or read from, may be checked via policy server 104, by utilizing a cached policy or a cached policy decision, to determine DLP actions to be taken for event 308, including but without limitation, allowing event 308 to complete, blocking event 308 from completion, etc., as described in further detail below.

Figure 5:
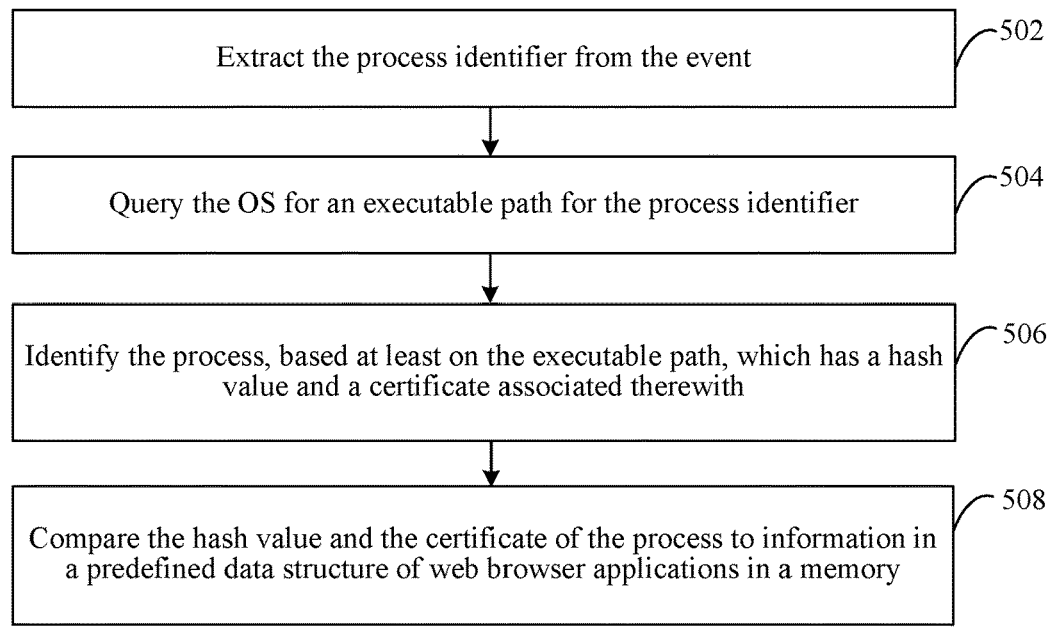
FIG. 5 shows a flowchart for network aware endpoint DLP in web transactions, in accordance with an example embodiment.

FIG. 5 will now be described. FIG. 5 shows a flowchart 500 for network aware endpoint DLP in web transactions, according to example embodiments. System 100 in FIG. 1 and/or system 200 in FIG. 2, e.g., via file system filter 208, operate according to flowchart 500, which may be an embodiment of flow diagram 300 of FIG. 3 and flowchart 400 of FIG. 4. Further structural and operational examples will be apparent to persons skilled in the relevant art(s) based on the following descriptions.

As noted above with respect to file system filter 208 in flow diagram 300 and step 404 of flowchart 400, determining that web browser application 222 causes event 308 includes determining a process identifier for event 308 and identifying web browser application 222 based on the process identifier. Flowchart 500 includes further details regarding these operations, and begins at step 502.

In step 502, to determine the process identifier, the process identifier is extracted from the event. For example, event controller 304 in flow diagram 300 may receive event information 310 of event 308 from event interceptor 302, as described for step 402 in flowchart 400. Event controller 304 is configured to extract the process identifier from event information 310.

The remaining steps of flowchart 500 provide example operations for identifying the instance of the web browser application based at least on the process identifier, in an example embodiment.

In step 504, the OS is queried for an executable path for the process identifier. For instance, event controller 304 in flow diagram 300 is configured to perform one of invocations 312 for an API of API(s) 306 with the extracted process identifier from step 502. One of API calls 314 queries OS 212 with the extracted process identifier, e.g., in the user space where OS 212 tracks executing processes in process list 216, and returns the executable path from process list 216 for the process based at least on the process identifier, along with a hash value and a browser certificate of the instance of web browser application 222 executing as the process.

In step 506, the process, which has a hash value and a certificate associated therewith, is identified based at least on the executable path. For example, event controller 304 is configured to identify the process based at least on the executable path, and in embodiments, based also on the certificate and/or the hash value. As noted above, web browser application 222 has associated data and information persisted in memory 206 as browser certificates and hash values 228. The hash value and browser certificate returned with the executable path may also be utilized by event controller 304 to identify the process. Once the process is identified, the hash value and browser certificate returned with the executable path can be used to verify if the process identified is an instance, tab, session, etc., of web browser application 222.

In step 508, the hash value and the certificate of the process are compared to information in a predefined data structure of web browser applications in a memory. For instance, browser certificates and hash values 228 in the user space of OS 212 can be queried through one of invocations 312 to API(s) 306 for one of API calls 314 with the hash value and the certificate of the process. The hash value and the certificate of the process from step 506 are compared to entries in the predefined data structure of web browser applications in memory 206 to determine if a match is present. A match positively verifies that the process identified is an instance, tab, session, etc., of web browser application 222.

Accordingly, it is determined that the process executing at the computing device and causing event 308 to occur is an instance of web browser application 222.

Embodiments herein for network aware endpoint DLP in web transactions also include the determination of an application, service, and/or the like at a remote device, e.g., remote device 102 in FIG. 1, that is associated with event 308. As described herein, an upload event corresponds to the reading of a file that will be transmitted via web browser application 222 from a client device (e.g., client device 106, computing system 202, etc.) to the remote device, while a download event corresponds to a write to a file that will be transmitted from the remote device to the client device via web browser application 222. Because the techniques herein enable "network aware" endpoint DLP in web transactions, the URL for the application, service, and/or the like at a remote device is utilized for DLP considerations. The URL may be determined in various ways without departing from the overall DLP processes set forth in this description. In this context, FIG. 6 will now be described.

Figure 6:
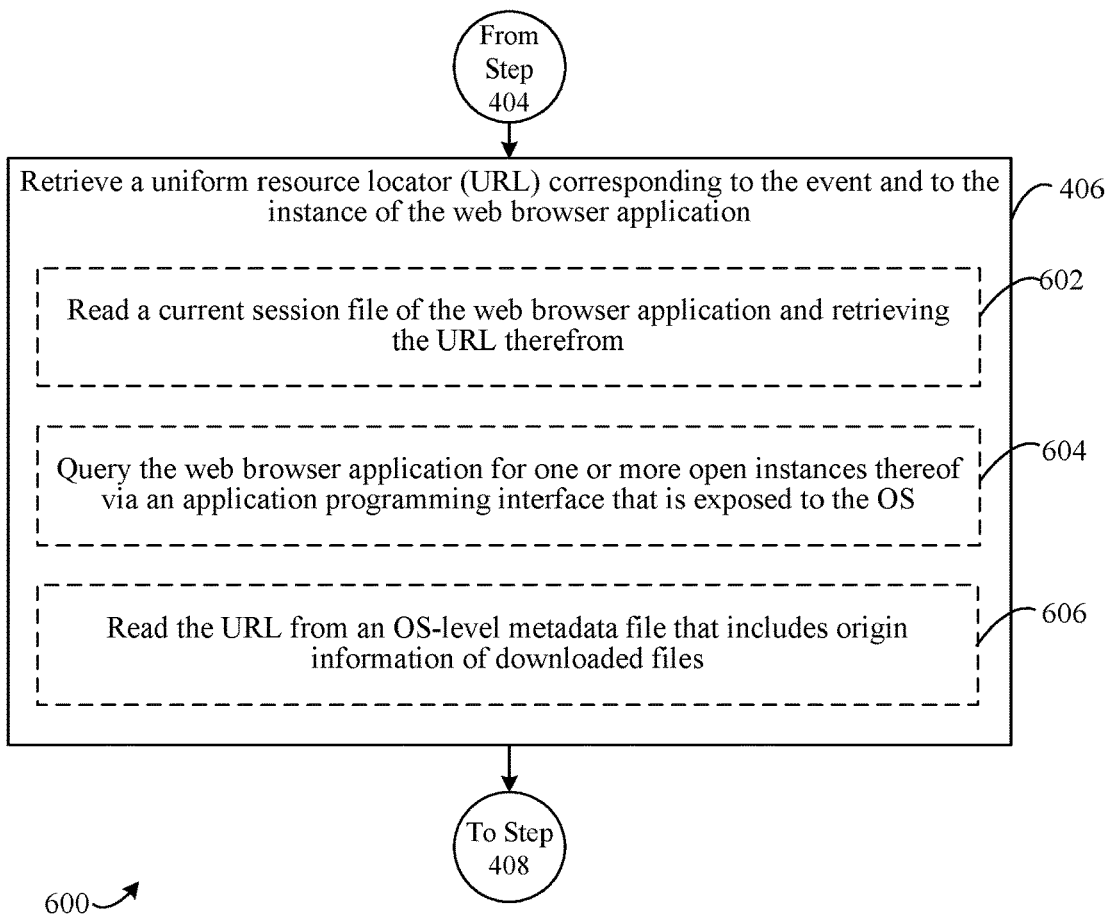
FIG. 6 shows a flowchart for network aware endpoint DLP in web transactions, in accordance with an example embodiment.

Turning now to FIG. 6, a flowchart 600 for network aware endpoint DLP in web transactions is shown, according to an example embodiment. System 100 in FIG. 1 and/or system 200 in FIG. 2, e.g., via file system filter 208, operate according to flowchart 600, which may be an embodiment of flow diagram 300 of FIG. 3 and flowchart 400 of FIG. 4, e.g., step 406 of flowchart 400 as described in view of file system filter 208 and flow diagram 300. Further structural and operational examples will be apparent to persons skilled in the relevant art(s) based on the following descriptions.

Flowchart 600 includes a step 602, a step 604, and a step 606, and one or more of these steps may be optionally performed to execute step 406 of flowchart 400, according to embodiments. Flowchart 600 may follow from step 404 in flowchart 400, described above.

In step 602, a current session file of the web browser application is read and the URL is retrieved therefrom. For instance, referring also back again to FIGS. 2 and 3, when the instance of web browser application 222 is determined, browser data 224 in FIG. 2 may be read via one of invocations 312 to an API of API(s) 306 from event controller 304, and an associated call of calls 314 retrieves the URL from browser data 224, as noted above for flow diagram 300. In embodiments, this call of calls 314 includes identifying information for the instance of web browser application 222 such that the call is enabled to find the corresponding URL in browser data 224.

In step 604, the web browser application is queried for one or more open instances thereof via an application programming interface that is exposed to the OS. For example, web browser application 222 is queried via one of invocations 312 to an API of API(s) 306 from event controller 304, and an associated call of calls 314 retrieves the URL from the corresponding instance, tab, session, etc., of web browser application 222, as noted above for flow diagram 300. In embodiments, this call of calls 314 includes identifying information for the instance of web browser application 222 such that the call is enabled to find the corresponding URL in the appropriate instance, tab, session, etc., of web browser application 222.

In step 606, the URL is read from an OS-level metadata file that includes origin information of download files. For instance, OS 212 may maintain and update metadata for file origins of download files in origin metadata 218, including source origins of download files and associated URLs, for origin metadata 218 stored persistently in memory 206. Origin metadata 218 in FIG. 2 may be read via one of invocations 312 to an API of API(s) 306 from event controller 304, and an associated call of calls 314 retrieves the URL from origin metadata 218, as noted above for flow diagram 300. In embodiments, this call of calls 314 includes identifying information for the file such that the call is enabled to find the corresponding URL for the download file in origin metadata 218.

On completion of one or more optional steps for flowchart 600, the flow of flowchart 400 may proceed to step 408.

It should be noted that while three optional steps are provided for flowchart 600, this set of steps is not to be considered exclusive for the embodiments herein, and further that optional steps performed may be selected based specific operational scenarios based at least on factors, such as but not limited to, the event source, the web browser application type, version, etc., the operating system type, version, etc., and/or the like.

In various embodiments for network aware endpoint DLP in web transactions, a policy server may be utilized for determinations of DLP actions to be taken for given events. As described above for FIG. 1, policy server 104 is configured to store policies and host a policy engine that evaluates events, as described herein, for compliance with the policies. Policies may be implemented via policy server 104 that prohibit events such as the upload or download of certain types of files, data, information, etc., that allow or block such events, that require encryption for such events, and/or the like, based at least on one or more factors, including but without limitation: an identity or type of service/application of remote device 102 associated with the event, the content of the files or content portions thereof, data, information, etc., an identity of the user of client device 106, and/or the like. In this context, FIGS. 7 and 8 will be described below.

Figure 7:
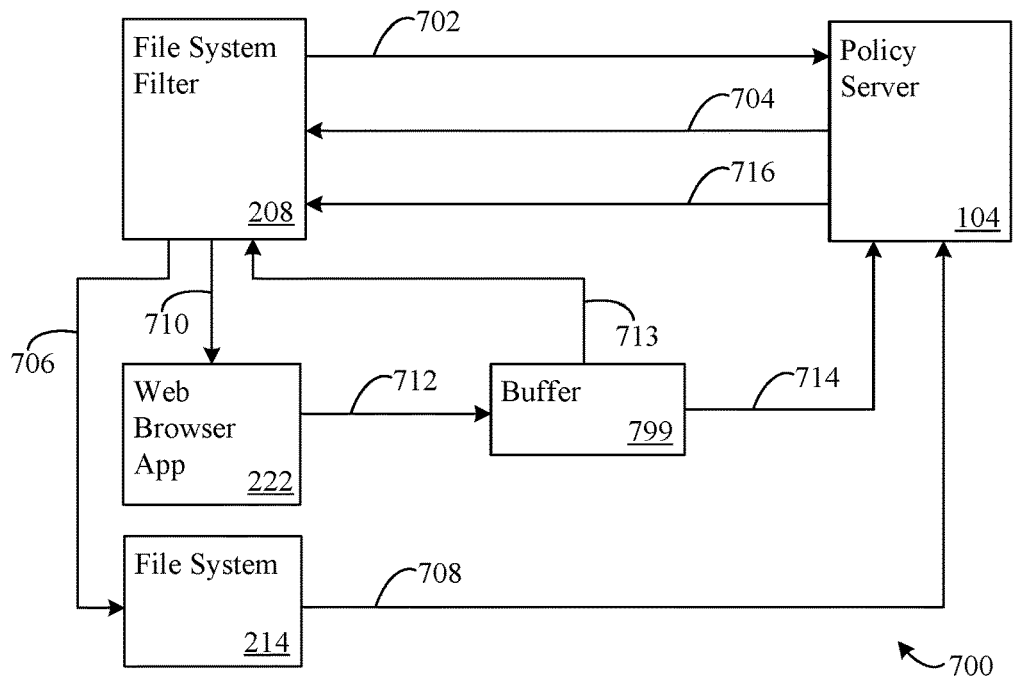
FIG. 7 shows a flow diagram for network aware endpoint DLP in web transactions, in accordance with an example embodiment.
Figure 8:
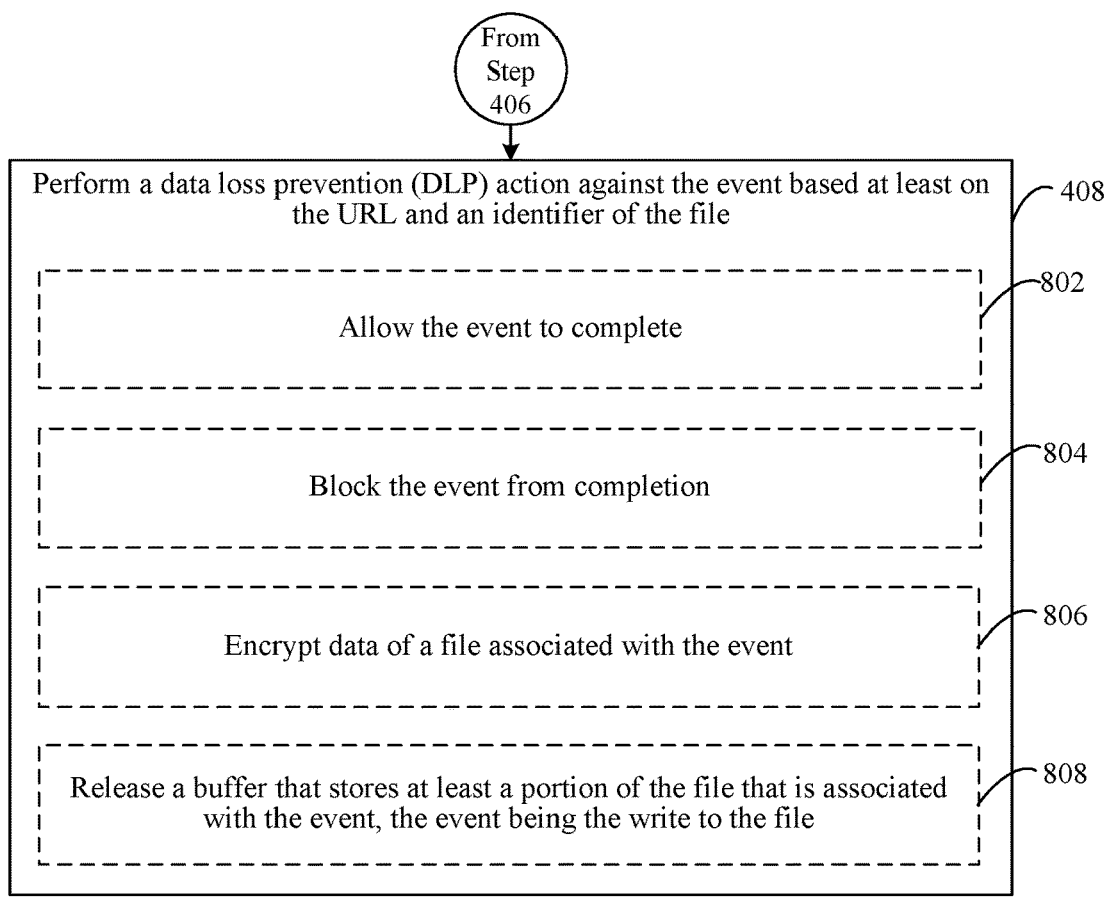
FIG. 8 shows a flowchart for network aware endpoint DLP in web transactions, in accordance with an example embodiment.

FIG. 7 shows a flow diagram 700 for network aware endpoint DLP in web transactions, according to an example embodiment. Flow diagram 700 is provided in the context of policy server 104 in FIG. 1 and file system filter 208 in FIG. 2. FIG. 8 illustrates a flowchart 800 for network aware endpoint DLP in web transactions, according to an example embodiment. System 100 in FIG. 1 and/or system 200 in FIG. 2, e.g., via file system filter 208, operate according to flow diagram 700 and flowchart 800 (which may be an embodiment of flow diagram 700 of FIG. 7 and of flowchart 400 of FIG. 4, e.g., step 408 of flowchart 400).

Further structural and operational examples will be apparent to persons skilled in the relevant art(s) based on the following descriptions. Flow diagram 700 and flowchart 800 are described below.

Flow diagram 700 in FIG. 7 includes a buffer 799, which is part of memory 206 of system 200, in embodiments. Buffer 799 is configured to buffer data of files that are associated with events for downloads/writes to files, as described herein, without persistently storing the data/files. Buffer 799 may be any size, and in embodiments, may be configured with a size, e.g., 50 MB (although any other size for buffer 799 is contemplated as noted above), that enables an amount of the file to be buffered enabling policy decision determinations while still limiting the amount of the file being buffered for performance and/or resource utilization considerations. The size of buffer 799 is configurable in embodiments.

In flow diagram 700, file system filter 208 provides the URL and the file identifier to policy server 104 that is configured to evaluate DLP policies for events, such as event 308 described for flow diagram 300 in FIG. 3. The URL and the file identifier, described above for the preceding FIGS., may be provided as policy metadata 702 for policy server 104 to render policy decisions on events. The provision policy metadata 702 is performed by invoking an API of API(s) 306 and placing a corresponding API call, in embodiments, as similarly described for flow diagram 300 above.

In some scenarios, policy server 104 is able to determine a policy decision 716 based on the provided policy metadata 702, and in such cases, policy decision 716 is provided to file system filter 208 to take a DLP action(s) based thereon, as described in further detail below. In other embodiments, policy server 104 may require additional information to make its policy decision. For example, a request 704 for additional event information is transmitted from policy server 104 to file system filter 208. Request 704 may stipulate that data of the file associated with the event be provided to policy server 104 for evaluation of the policy(ies).

For upload events in which a file is read from the client system, request 704 is fulfilled by file system filter, e.g., via API(s) 306 as described herein, sending an instruction 706 to file system 214. Instruction 706 specifies the file is to be provided to policy server 104, and in file system 214 provides a communication 708 that includes the file to policy server 104. In some embodiments, a portion of the file is provided to policy server 104, and additional iterations of request 704, instruction 706, and communication 708 may be performed. Policy server 104 is thus enabled to determine policy decision 716 and provide it to file system filter 208.

For download events in which a file is written to the client system, request 704 is fulfilled by file system filter, e.g., via API(s) 306 as described herein, sending an instruction 710 to web browser application 222, which may generate an "open" system call, to initialize writing of the beginning of the file, which is observed by file system filter 208. That is, instruction 710 specifies that a "write" operation for the file to be written be made to buffer 799, and this operation begins with "open." The specified write operation may be an operation that writes a relatively small amount of file data 712 at one time to buffer 799. That is, many iterations of the write operation may be performed by reissuing instruction 710 until the size limit of buffer 799 is reached or until the entire file is buffered, e.g., when a "close" system call is detected by file system filter 208.

A monitoring signal 713 or other equivalent indicia of buffer capacity may be used by file system filter 208 to determine how many such write operations are performed. In one embodiment, instead of monitoring signal 713, file system filter 208 may track the number of write operations made by web browser application 222 and determine the amount of file data written to buffer 799 given a size of each write operation. In response to the entire file being written to buffer 799, or to buffer 799 filling up, a communication 714 that includes at least a portion of the file is provided to policy server 104 from buffer 799. Policy server 104 is thus enabled to determine policy decision 716 and provide it to file system filter 208.

Turning now to FIG. 8, Flowchart 800 includes a step 802, a step 804, a step 806, and a step 808, and one or more of these steps may be optionally performed to execute step 408 of flowchart 400 for taking a DLP action against the event, according to embodiments. Flowchart 800 may follow from step 406 in flowchart 400, described above.

In step 802, the event is allowed to complete. For instance, policy server 102 may return a policy decision that indicates event 308 is allowed to complete as the DLP action taken against event 308. The hold on the read or write operation associated with event 308 is released by file system filter 208, and the operation is performed.

In step 804, the event is blocked from completion. For example, policy server 102 may return a policy decision that indicates event 308 is not allowed to complete and is blocked as the DLP action taken against event 308. The hold on the read or write operation associated with event 308 is released by file system filter 208, and the operation is discarded.

In step 806, data of the file associated with the event is encrypted. For instance, policy server 102 may return a policy decision that allows event 308 to complete, as described for step 802, but requires that data associated with the file be encrypted for the upload or download of the file. File data may be buffered and encrypted prior to the upload or download operation being completed, as would be understood by persons of skill in the relevant art(s) having the benefit of this disclosure. While not expressly described for the sake of brevity, any type of encryption method is contemplated herein, and may be performed via software and/or hardware (e.g., via trusted platform module (TPM) or other mechanism(s)).

In step 808, a buffer that stores at least a portion of the file associated with the event is released, and the event is the write to the file. For example, as noted above, when policy server 104 requires additional information to make a policy decision, a request may be received for file data to be provided to policy server 104. In these cases, e.g., for download/write events, the file data may be received from web browser application 222 and buffered by buffer 799 without persistently storing the file data. With additional reference to flow diagram 700, when the policy decision to allow or block a download/write event for which file data was requested by policy server 104, buffer 799 is released. Additionally, file data in buffer 799 may be encrypted via buffer 799 prior to being released.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 in FIG. 1 and system 200 in FIG. 2, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

FIG. 9 is a block diagram of an exemplary mobile system 900 that includes a mobile device 902 that may implement embodiments described herein. For example, mobile device 902 may be used to implement any system, client, or device, or components/subcomponents thereof, in the preceding sections. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smartphone, handheld computer, Personal Digital Assistant (PDA), etc.)

and can allow wireless two-way communications with one or more mobile communications networks 904, such as a cellular or satellite network, or with a local area or wide area network.

Mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

Mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and application programs 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing one or more of system 100 in FIG. 1 and system 200 in FIG. 2, along with any components and/or subcomponents thereof, as well as the flowcharts/flow diagrams described herein, including portions thereof, and/or further examples described herein.

Mobile device 902 can include a mobile TPM 992. Mobile TPM 992 may be a mobile device equivalent embodiment of a TPM, as would be understood by one of skill in the relevant art(s) having the benefit of this disclosure. For example, mobile TPM 992 may be configured to perform one or more functions or operations of TPMs for various embodiments herein.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device. Input devices 930 can include a Natural User Interface (NUI).

One or more wireless modems 960 can be coupled to antenna(s) (not shown) and can support two-way communications between processor 910 and external devices, as is well understood in the art. Modem 960 is shown generically and can include a cellular modem 966 for communicating with the mobile communication network 904 and/or other radio-based modems (e.g., Bluetooth 964 and/or Wi-Fi 962). At least one wireless modem 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to implement any of the above-described features of flowcharts herein. Computer program logic for performing any of the operations, steps, and/or functions described herein may be stored in memory 920 and executed by processor 910.

Figure 10:
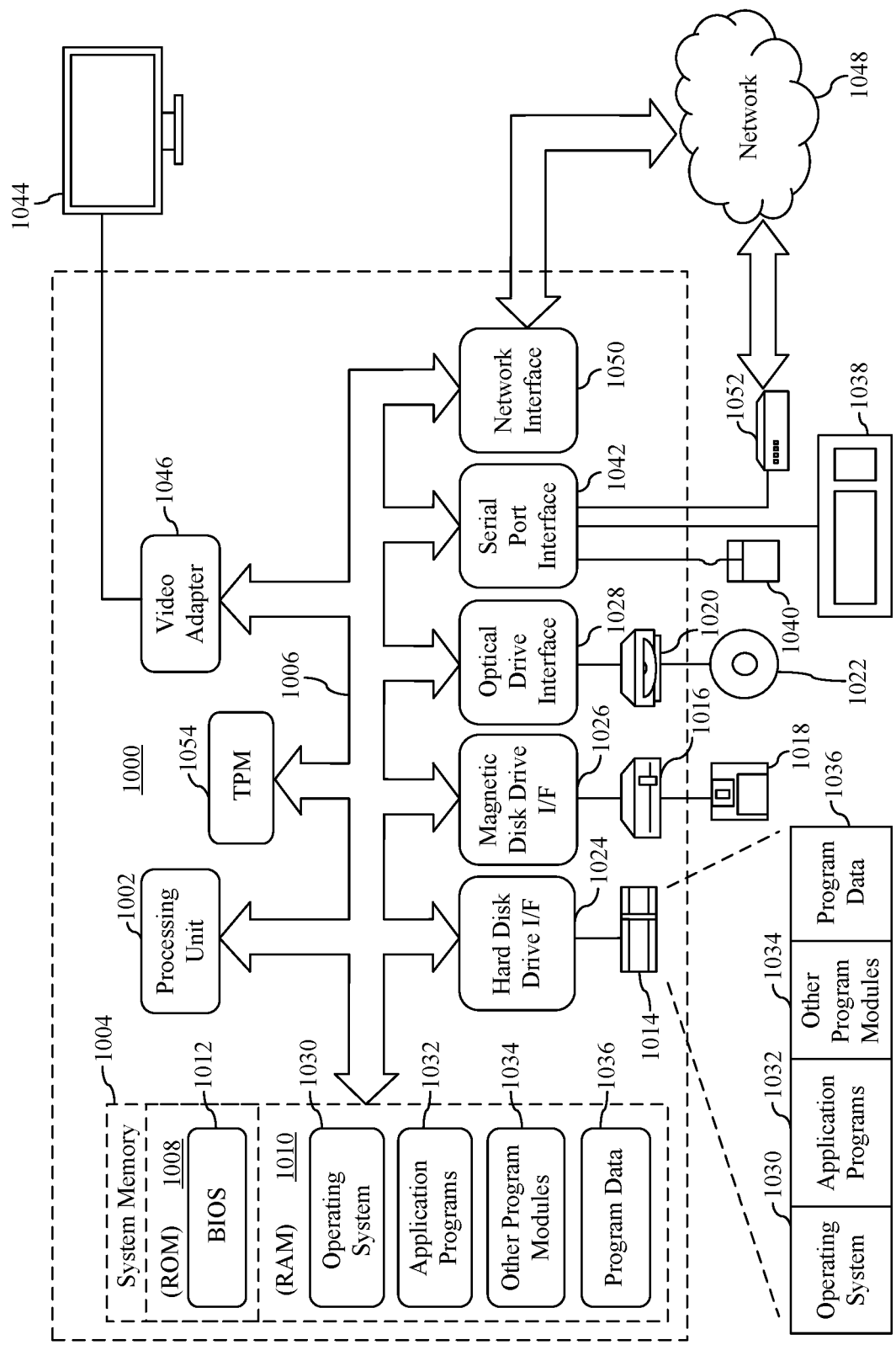
FIG. 10 shows a block diagram of an example computing device that may be used to implement embodiments.

FIG. 10 depicts an exemplary implementation of a computing device 1000 in which embodiments may be implemented. For example, embodiments described herein may be implemented in one or more computing devices or systems similar to computing device 1000, or multiple instances of computing device 1000, in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, servers, and/or clusters, etc., as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing embodiments described herein, such as but not limited to, s system 100 in FIG. 1 and system 200 in FIG. 2, along with any components and/or subcomponents thereof, as well as the flowcharts/flow diagrams described herein, including portions thereof, and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

TPM 1054 may be connected to bus 1006, and may be an embodiment of any TPM, as would be understood by one of skill in the relevant art(s) having the benefit of this disclosure. For example, TPM 1054 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for network aware endpoint data loss prevention (DLP) in web transactions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

According to the described embodiments for network aware endpoint DLP in web transactions, an endpoint DLP solution is enabled to be network aware, providing knowledge for a local client to associate network activities for uploads and downloads while also having knowledge client-side activities. Additionally, the described embodiments provide both network- and client-side knowledge, without the injection of code that was previously required to handle the recent variations in web transmission formats, thus reducing computational and bandwidth overhead. The embodiments herein utilize a unique implementation and methodology for network aware endpoint DLP in web transactions at the OS level of the client device that were previously not available for software-based DLP solutions, much less for the specific embodiments described herein performed by a file system filter at the OS level. The described embodiments are also adaptable to different types of web browser applications and OS types.

In some alternative embodiments, libraries may be injected into running processes (e.g., applications) to force the processes to run functions and operations associated with the embodiments described herein.

The additional examples and embodiments described in this Section may be applicable to examples disclosed in any other Section or subsection of this disclosure.

Embodiments in this description provide for systems, devices, and methods for network aware endpoint DLP in web transactions. For instance, a method performed by a file system filter in an operating system (OS) of a computing device is described herein for such embodiments. The method includes intercepting an event in the OS, the event being a read of or a write to a file, determining that a process executing at the computing device and causing the event to occur is an instance of a web browser application, retrieving a uniform resource locator (URL) corresponding to the event and to the instance of the web browser application, and performing a data loss prevention (DLP) action against the event based at least on the URL and an identifier of the file.

In an embodiment of the method, the determining that the process executing at the computing device and causing the event to occur is the instance of the web browser application includes: determining a process identifier for the event based at least on said intercepting and event information; and identifying the instance of the web browser application based at least on the process identifier.

In the embodiment of the method, the determining the process identifier includes extracting the process identifier from the event, and the identifying the instance of the web browser application includes: querying the OS for an executable path for the process identifier, identifying the process, based at least on the executable path, which has a hash value and a certificate associated therewith, and comparing the hash value and the certificate of the process to information in a predefined data structure of web browser applications in a memory.

In an embodiment of the method, the retrieving the URL includes at least one of: reading a current session file of the web browser application and retrieving the URL therefrom, querying the web browser application for one or more open instances thereof via an application programming interface that is exposed to the OS, or reading the URL from an OS-level metadata file that includes origin information of download files.

In an embodiment, the method, prior to performing the DLP action, includes providing the URL and the file identifier to a policy server that is configured to evaluate DLP policies for events, and in response to said providing the URL and the file identifier, receiving an indication of the DLP action to be performed from the policy.

In the embodiment, the method, prior to receiving the indication of the DLP action to be performed, includes: receiving a request for additional information from the policy server, and providing at least a portion of the file associated with the event to the policy server.

In the embodiment of the method, the event is the write to the file, and providing the at least a portion of the file includes: enabling the instance of the web browser application to initiate a download of the file, and buffering the at least a portion of the file during the download for provision to the policy server, while preventing the at least a portion of the file from being saved to a persistent storage at the computing device.

In an embodiment of the method, the DLP action includes at least one of: allowing the event to complete, blocking the event from completion, encrypting data of the file associated with the event, or releasing a buffer that stores at least a portion of the file associated with the event, the event being the write to the file.

A computing system is also described herein. In an embodiment, the system includes at least one memory that stores program code, and a processing system, comprising one or more processors, configured to receive the program code from the at least one memory and, in response to at least receiving the program code, to perform operations. The operations include to intercept an event in the OS, the event being a read of or a write to a file, determine that a process executing at the computing device and causing the event to occur is an instance of a web browser application, retrieve a uniform resource locator (URL) corresponding to the event and to the instance of the web browser application, and perform a data loss prevention (DLP) action against the event based at least on the URL and an identifier of the file.

In an embodiment of the computing system, to determine that the process executing at the computing device and causing the event to occur is the instance of the web browser application includes to: determine a process identifier for the event based at least on said intercepting and event information, and identify the instance of the web browser application based at least on the process identifier.

In the embodiment, to determine the process identifier includes to extract the process identifier from the event, and to identify the instance of the web browser application includes to: query the OS for an executable path for the process identifier, identify the process, based at least on the executable path, which has a hash value and a certificate associated therewith, and compare the hash value and the certificate of the process to information in a predefined data structure of web browser applications in a memory of the computing system.

In an embodiment of the computing system, to retrieve the URL includes at least one of to: read a current session file of the web browser application and retrieving the URL therefrom, query the web browser application for one or more open instances thereof via an application programming interface that is exposed to the OS, or read the URL from an OS-level metadata file that includes origin information of download files.

In an embodiment of the computing system, the processing system is configured, in response to at least receiving the program code, and prior to said perform the DLP action, to: provide the URL and the file identifier to a policy server that is configured to evaluate DLP policies for events, and in response to said provide the URL and the file identifier, receive an indication of the DLP action to be performed from the policy.

In the embodiment, the processing system is configured, in response to at least receiving the program code, and prior to said receive the indication of the DLP action to be performed, to: receive a request for additional information from the policy server, and provide at least a portion of the file associated with the event to the policy server.

In the embodiment, the event is the write to the file, and to provide the at least a portion of the file includes to: enable the instance of the web browser application to initiate a download of the file, and buffer the at least a portion of the file during the download for provision to the policy server, while preventing the at least a portion of the file from being saved to a persistent storage at the computing device.

In an embodiment of the computing system, the DLP action includes at least one of to: allow the event to complete, block the event from completion, encrypt data of the file associated with the event, or release a buffer that stores at least a portion of the file associated with the event, the event being the write to the file.

A computer-readable storage medium having program instructions recorded thereon that, when executed by a processing system, perform a method by a file system filter in an operating system (OS), is also described. The method includes intercepting an event in the OS, the event being a read of or a write to a file, determining that a process executing at the computing device and causing the event to occur is an instance of a web browser application, retrieving a uniform resource locator (URL) corresponding to the event and to the instance of the web browser application, and performing a data loss prevention (DLP) action against the event based at least on the URL and an identifier of the file.

In an embodiment of the computer-readable storage medium, determining that the process executing at the computing device and causing the event to occur is the instance of the web browser application includes: determining a process identifier for the event based at least on said intercepting and event information, and identifying the instance of the web browser application based at least on the process identifier.

In an embodiment of the computer-readable storage medium, retrieving the URL includes at least one of: reading a current session file of the web browser application and retrieving the URL therefrom, querying the web browser application for one or more open instances thereof via an application programming interface that is exposed to the OS, or reading the URL from an OS-level metadata file that includes origin information of download files.

In an embodiment of the computer-readable storage medium, the event is the write to the file, and the method further includes, prior to performing the DLP action: providing the URL and the file identifier to a policy server that is configured to evaluate DLP policies for events; receiving a request for additional information from the policy server; providing at least a portion of the file associated with the event to the policy server, including: enabling the instance of the web browser application to initiate a download of the file, and buffering the at least a portion of the file during the download for provision to the policy server, while preventing the at least a portion of the file from being saved to a persistent storage at the computing device; and in response to said providing the URL and the file identifier, receiving an indication of the DLP action to be performed from the policy.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method performed by a file system filter of a computing device, the method comprising:
   intercepting, by the file system filter, a request to read from or write to a file, the request comprising a process identifier identifying a process executing on the computing device;
   determining, based on the process identifier, that the process is an instance of a web browser application;
   retrieving a uniform resource locator (URL) corresponding to the request; and
   performing a data loss prevention (DLP) action against the request based at least on the URL and an identifier of the file.

2. The method of claim 1, wherein said determining, based on the process identifier, that the process is an instance of a web browser application comprises:
   determining, based on the process identifier, an executable path for the process;
   identifying, based at least on the executable path, a hash value and a certificate associated with the process; and
   comparing the hash value and the certificate associated with the process to a browser certificate and hash value associated with the web browser application.

3. The method of claim 1, wherein said retrieving the URL comprises at least one of:
   reading a current session file of the web browser application and retrieving the URL therefrom;
   querying the web browser application for one or more open instances thereof via an application programming interface; or
   reading the URL from an operating system-level metadata file that comprises origin information of download files.

4. The method of claim 1, further comprising:
   providing the URL and the file identifier to a policy server configured to evaluate DLP policies; and
   receiving, from the policy server, an indication of the DLP action to be performed.

5. The method of claim 4, further comprising:
   receiving, from the policy server, a request for additional information; and
   providing at least a portion of the file associated with the request to the policy server.

6. The method of claim 5, wherein the request is a request to write to the file; and
   wherein said providing the at least a portion of the file comprises:
   enabling the instance of the web browser application to initiate a download of the file; and
   buffering the at least a portion of the file during the download for providing to the policy server, while preventing the at least a portion of the file from being saved to a persistent storage at the computing device.

7. The method of claim 1, wherein the DLP action comprises at least one of:
   allowing the request to complete;
   blocking the request from completion;
   encrypting data of the file associated with the request; or
   releasing a buffer that stores at least a portion of the file associated with the request.

8. The method of claim 2, wherein said determining, based on the process identifier, an executable path for the process comprises:

querying, based on the process identifier, a process list for the execution path.

9. A computing system, comprising:
a processor; and
a memory that stores program code structured to cause the processor to:
intercept a request to read from or write to a file, the request comprising a process identifier identifying a process executing on the computing device;
determine, based on the process identifier, that the process is an instance of a web browser application;
retrieve a uniform resource locator (URL) corresponding to the request; and
perform a data loss prevention (DLP) action against the request based at least on the URL and an identifier of the file.

10. The computing system of claim 9, wherein, to determine, based on the process identifier, that the process is an instance of a web browser application, the program code causes the processor to:
determine, based on the process identifier, an executable path for the process;
identify, based at least on the executable path, a hash value and a certificate associated with the process; and
compare the hash value and the certificate associated with the process to a browser certificate and a hash value associated with the web browser application.

11. The computing system of claim 9, wherein, to retrieve the URL corresponding to the request, the program code is structured to cause the processor to perform at least one of:
read a current session file of the web browser application and retrieving the URL therefrom;
query the web browser application for one or more open instances thereof via an application programming interface; or
read the URL from an operating system-level metadata file that comprises origin information of download files.

12. The computing system of claim 9, wherein the program code is structured to further cause the processor to:
provide the URL and the file identifier to a policy server that is configured to evaluate DLP policies; and
receive, from the policy server, an indication of the DLP action to be performed.

13. The computing system of claim 12, wherein the program code is structured to further cause the processor to:
receive, from the policy server, a request for additional information; and
provide at least a portion of the file associated with the request to the policy server.

14. The computing system of claim 13, wherein the request is a request to write to the file; and
wherein, to provide the at least a portion of the file, the program code is structured to cause the processor to:
enable the instance of the web browser application to initiate a download of the file; and
buffer the at least a portion of the file during the download for providing to the policy server, while preventing the at least a portion of the file from being saved to a persistent storage at the computing device.

15. The computing system of claim 9, wherein, to perform the DLP action, the program code is structured to cause the processor to perform at least one of:
allow the request to complete;
block the request from completion;
encrypt data of the file associated with the request; or
release a buffer that stores at least a portion of the file associated with the request.

16. A computer-readable storage medium comprising program instructions recorded thereon that, when executed by a processor, cause the processor to:
intercept a request to read from or write to a file, the request comprising a process identifier identifying a process executing on the computing device;
determine a process, based on the process identifier, that the process is an instance of a web browser application;
retrieve a uniform resource locator (URL) corresponding to the request; and
perform a data loss prevention (DLP) action against the request based at least on the URL and an identifier of the file.

17. The computer-readable storage medium of claim 16, wherein, to determine, based on the process identifier, that the process is an instance of a web browser application, the program instructions, when executed by the processor, cause the processor to:
determine, based on the process identifier, an executable path for the process;
identify, based at least on the executable path, a hash value and a certificate associated with the process; and
compare the hash value and the certificate associated with the process to a browser certificate and a hash value associated with the web browser application.

18. The computer-readable storage medium of claim 16, wherein, to perform the DLP action, the program instructions, when executed by the processor, cause the processor to perform at least one of:
allow the request to complete;
block the request from completion;
encrypt data of the file associated with the request; or
release a buffer that stores at least a portion of the file associated with the request.

19. The computer-readable storage medium of claim 16, wherein, to retrieve the URL, the program instructions, when executed by the processor, cause the processor to perform at least one of:
read a current session file of the web browser application and retrieving the URL therefrom;
query the web browser application for one or more open instances thereof via an application programming interface; or
read the URL from an operating system-level metadata file that comprises origin information of download files.

20. The computer-readable storage medium of claim 16, wherein the request is a request to write to the file; and
wherein, to perform the DLP action, the program instructions, when executed by the processor, cause the processor to:
provide the URL and the file identifier to a policy server configured to evaluate DLP policies;
receive, from the policy server, a request for additional information;
provide at least a portion of the file associated with the event to the policy server by:
enabling the instance of the web browser application to initiate a download of the file, and
buffering the at least a portion of the file during the download for providing to the policy server, while preventing the at least a portion of the file from being saved to a persistent storage at the computing device; and receive, from the policy server, an indication of the
DLP action to be performed.

\* \* \* \* \*